Patented Oct. 12, 1954

2,691,644

UNITED STATES PATENT OFFICE 2,691,644

SULFONATION METHOD

Harold H. Roth, Bay City, Mich., assignor to The Dow Chemical Company, Midland, Mich., a corporation of Delaware No Drawing. Application February 21, 1952, Serial No. 272,888

9 Claims. (Cl. 260—79.3)

This invention concerns an improved method for sulphonating resinous polynuclear aromatic substances, particularly alkenyl aromatic resins, to introduce sulphonic acid radicals into the molecule while at the same time avoiding appreciable introduction, or formation, of other kinds of groups or radicals in the products.

The alkenyl aromatic resins with which the invention is particularly concerned are benzene-soluble thermoplastic polymers and copolymers of alkenyl aromatic compounds having the general formula:

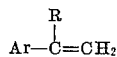

wherein Ar represents a monovalent aromatic radical and R represents hydrogen or a methyl group. Examples of such alkenyl aromatic resins are the solid homopolymers of styrene, alpha-methylstyrene, ar-methylstyrene, ar-dimethyl-styrene, ar-methyl-alpha-methylstyrene, and ar-chlorostyrene; the solid copolymers of any two or more of such compounds with one another; and the solid copolymers of one or more of such alkenyl aromatic compounds with a minor amount, e. g. up to 10 per cent by weight, of other polymerizable monoolefinic hydrocarbons such as butenes, diisobutylene, or pentenes; etc.

It is known that such alkenyl aromatic resins, e. g. polystyrene, just mentioned may be sulphonated by reaction with usual sulphonating agents such as concentrated sulphuric acid, fuming sulphuric acid, chlorosulphonic acid or sulphur trioxide, etc., to form resin sulphonic acids which vary widely in properties, depending upon the extent of the sulphonation reaction and the conditions under which the reaction is carried out. For instance, polystyrene of a given molecular weight may be sulphonated to obtain polystyrene sulphonic acids which are water-insoluble, or to obtain polystyrene sulphonic acids which are soluble in water. The polystyrene sulphonic acids that are water-soluble vary as regards their effect of thickening, i. e. increasing the viscosity, of water in which they are dissolved. For instance, polystyrene may be sulphonated to a given extent to obtain a product which thickens water greatly when dissolved therein, or it may be sulphonated to the same extent to obtain a product having only a moderate effect of thickening water. Very slight changes in the sulphonation conditions are frequently sufficient to cause a change from one such type of product to another, and it is difficult by the known sulphonation methods, to sulphonate successive batches of the same kind of alkenyl aromatic resin to obtain a product of uniform and consistent quality.

A usual method for accomplishing the sulphonation is to dissolve the polystyrene, or other alkenyl aromatic resin, in a liquid polychlorinated aliphatic hydrocarbon, such as ethylene chloride or carbon tetrachloride, etc., e. g. to form an approximately 10 weight per cent solution of the polymer, and treat the resultant solution with a sulphonating agent such as chlorosulphonic acid, or an ether complex of sulphur trioxide, while maintaining the mixture at temperatures in the order of —20° to 30° C. This known method permits production of resin sulphonates which are soluble in water, but it does not permit ready control of the reaction conditions so as repeatedly to produce a product having the same thickening action toward water. It frequently happens that in repeated experiments, which are carried out under as nearly identical reaction conditions as possible, there is obtained in one experiment a product having only a moderate thickening action toward water and in another experiment a product having a pronounced effect of thickening water. Because of the difficulty of repeatedly producing a product of consistent quality, the known method just mentioned is not well adapted to commercial practice.

It is an object of this invention to provide an improved method for the sulphonation of resinous polynuclear aromatic substances, particularlyl polyalkenyl aromatic resins, which permits repeated production of a resin sulphonate product of consistent and uniform quality. Another object is to provide such method which permits the sulphonation to be carried out with introduction of sulphonic acid radicals into the resin molecule, but without appreciable introduction, or formation, of other groups or radicals, e. g. of cross-linkages in the product such as would cause pronounced thickening of a medium in which the product is dissolved. Other objects will be evident from the following description of the invention.

It has been found that certain liquid mixtures of sulphur dioxide and chlorinated aliphatic hydrocarbons serve as excellent media for the sulphonation with sulphur trioxide of resinous polynuclear aromatic substances, and that they have an effect of permitting introduction of sulphonic acid radicals into the resins without appreciable concurrent introduction or formation of other kinds of groups or radicals, e. g. of cross-linkages which would modify the properties of the product. In this respect, the mixed solvents which are provided by the invention differ markedly from the individual ingredients thereof and from most other solvents heretofore employed as media for sulphonation reactions. Neither sulphur dioxide nor the chlorinated aliphatic hydrocarbon ingredients of the solvent mixtures which are provided by the invention can be used alone as the sulphonation medium as satisfactorily as can the solvent mixture.

The liquid solvent mixtures of the invention consist essentially of from 20 to 80, preferably from 30 to 70, per cent by weight of liquid sulphur dioxide, the remainder being one or more of the compounds methylchloroform (i. e. 1,1,1-trichloroethane), methylene chloride, ethylene chloride, carbon tetrachloride, and tetrachloroethylene. Mixtures of sulphur dioxide with one or both of the compounds carbon tetrachloride and tetrachloroethylene are preferred.

The invention may be applied with advantage in effecting the nuclear sulphonation of any benzene-soluble resinous or resin-forming polynuclear aromatic substance, e. g. indene resins, soluble phenol-formaldehyde condensation products, etc., but it is concerned particularly with the sulphonation of thermoplastic alkenyl aromatic resins. The polynuclear aromatic substance which is to be sulphonated may be of any desired molecular weight and alkenyl aromatic resins, or polymers, ranging from the dimers up to molding grades having molecular weights as high as 200,000 or thereabout can be sulphonated in accordance with the invention to obtain water-soluble resin, or polymer, sulphonates.

The sulphur trioxide which is employed in the process may be freshly formed, or may be sulphur trioxide which has been stabilized against polymerization in known ways and placed in storage. Unstabilized sulphur trioxide which has been permitted to stand for some time, e. g. a day or more, is less satisfactory for use in the sulphonation reaction.

In practice of the invention, polystyrene, or other resinous polynuclear aromatic substance, is dissolved in a liquid mixture of sulphur dioxide and one or more of the aforementioned chlorinated aliphatic hydrocarbons, e. g. methylene chloride, carbon tetrachloride, or tetrachloroethylene. The mixed solvent contains from 20 to 80, preferably from 30 to 70, per cent by weight of sulphur dioxide. The solution thus formed may contain 5 weight per cent or less, preferably from 0.5 to 2 per cent, of the polynuclear aromatic substance which is to be sulphonated. The solution is stirred and maintained at temperatures between —20° and 40° C., preferably between —15° and 0° C., and a 5 weight per cent or less, preferably from 0.5 to 2 per cent, solution of sulphur trioxide in a separate portion of the aforementioned mixed solvent, or in one of the ingredients of the mixed solvent, is added with stirring. The addition is preferably made quite rapidly, e. g. over a period of from 1 to 20 minutes and usually about 5 minutes. The reaction is carried out at a pressure sufficient to maintain a major portion of the solvent mixture in liquid condition. When using a mixture of sulphur dioxide and carbon tetrachloride as the reaction medium and employing a reaction temperature of —10 C. or lower, the reaction can be carried out at atmospheric pressure, but at reaction temperatures of from —10° to 40° C., a moderate pressure, e. g. up to 80 pounds per square inch or thereabout, may be required to maintain the solvent mixture in liquid condition. In most instances, it is advantageous to carry the reaction out in a pressure-resistant vessel and at a pressure somewhat greater than atmospheric pressure.

The proportion of sulphur trioxide which is employed in the reaction may be varied widely, e. g. the sulphur trioxide may be used in a proportion as small as that theoretically required for introduction of 0.1 sulphonate radical per aromatic nucleus of the resin under treatment. However, the invention is of particular advantage when applied for the production of water-soluble resin sulphonates and for this purpose the sulphur trioxide is usually employed in a proportion corresponding to that theoretically required for the introduction of between 0.7 and 1.1 sulphonic acid radical per aromatic nucleus of the resin under treatment. The solvent mixture is used in a proportion such that the combined weight of the sulphur-trioxide and resin starting materials (and, accordingly, the weight of the resin sulphonic acid product) corresponds to not more than 3, and preferably from 0.5 to 2, per cent of the weight of the entire reaction mixture. The employment of the reactants and solvent mixture in these proportions results in formation of a slurry, of the sulphonated alkenyl aromatic resin product, that is flowable and conveniently handled and facilitates production of a sulphonated alkenyl aromatic resin of good quality.

The reaction for sulphonation of the resin occurs rapidly and proceeds nearly to completion within a few seconds after bringing the reactants into admixture with one another. However, a slight amount of further sulphonation frequently occurs on permitting the mixture to stand, e. g. for 10 minutes or longer. It is important that the mixture be maintained at the aforementioned temperatures of from —20° to 40° C., preferably from —15° to 0° C., during the major part of the sulphonation reaction.

The sulphonated resin product may be separated from the reacted mixture in usual ways. When the method is applied in sulphonating an alkenyl aromatic resin, the resin sulphonic acid usually precipitates in a granual condition as it is formed, and it may be separated from the reaction mixture by filtration. Any unreacted sulphur trioxide present in the reacted mixture tends to remain dissolved in the mixed solvent rather than becoming absorbed in the product; hence, the granular product is usually obtained in a form nearly free from unreacted sulphur trioxide. It may advantageously be washed with liquid sulphur dioxide, or with the aforementioned mixed solvent comprising sulphur dioxide, to remove remaining traces of sulphur trioxide.

The method as just described may be applied in sulphonating successive batches of polystyrene, or other alkenyl aromatic resins, to obtain a resin sulphonic acid product of consistent quality from one batch to another. The method may be applied in producing water-soluble alkenyl aromatic resin sulphonic acids which have only a moderate effect of thickening water when dissolved therein, which effect is far less than that of resin sulphonic acids produced from similar resin starting materials by sulphonation methods heretofore known in the art. It appears that the method of the invention results in the introduction of sulphonic acid radicals into the resin molecule without concurrent introduction, or formation, of crosslinking sulphone radicals, whereas previously known sulphonation methods have resulted in the concurrent introduction both of sulphonic acid radicals and of cross-linkages in the sulphonated resin products.

The above-described batchwise mode of carrying out the sulphonation reaction is convenient and entirely satisfactory for practice on a small scale, e. g. a laboratory scale, but the reaction becomes more difficult to control as the size of the batches is increased. However, the method can conveniently be carried out in a continuous manner which is well adapted for employment on a commercial scale.

In carrying out the process in a continuous manner, a stream of a solution of sulphur trioxide in the aforementioned mixed solvent, or in one of the ingredients of the mixed solvent, and a stream of a solution of the resin starting material in another portion of such mixed solvent, or in an ingredient of the mixed solvent, are fed into admixture with one another to form a mixture containing all of the starting ingredients in the relative proportions hereinbefore specified. The mixture is formed at temperatures between —20° and 40° C. and at a pressure sufficient to maintain a major portion of the solvent mixture in liquid condition. The sulphonation occurs almost instantaneously upon bringing the reactants into admixture with one another and the sulphonated resin product usually separates in granular condition as it is formed. Accordingly, the sulphonation mixture may be passed quite rapidly through a reaction zone and thence to a filtering device for separating the product.

The following examples describe a number of ways in which the invention has been practiced, and illustrate certain of its advantages, but are not to be construed as limiting the invention.

EXAMPLE 1

A pressure-resistant vessel was cooled to approximately —20° C. and charged with 270 ml. of carbon tetrachloride, 270 ml. of liquid sulphur dioxide and 10 grams of polystyrene having a solution viscosity of 37 centipoises at 25° C. The expression "solution viscosity," as employed in this and the following examples, refers to the viscosity of a solution of 10 parts by weight of a resin and 90 parts of toluene at 25° C. The vessel containing the above-mentioned starting materials was closed and permitted to warm to room temperature, at which time the mixture had developed a vapor pressure of 20 pounds per square inch, gauge. Another solution of 6.6 ml. of liquid sulphur trioxide in a liquid mixture of 200 ml. of sulphur dioxide and 200 ml. of carbon tetrachloride was fed to the vessel in a period of 3 minutes while vigorously agitating the mixture in the vessel. The mixture was agitated for 10 minutes after completing the addition. The vessel was then opened to release the pressure and the mixture contained therein was removed. The reacted mixture consisted of a slurry of a granular sulphonated polystyrene in the liquid reaction medium. The mixture was filtered to separate the sulphonated polystyrene and the residual product was washed with diethyl ether and dried. The product was analyzed and found to contain an average of approximately 0.93 sulphonic acid radical per aromatic nucleus of the same. A portion of the product was neutralized with a dilute aqueous sodium hydroxide solution to form a solution containing 0.55 per cent by weight of the sodium salt of the sulphonated polystyrene. This solution had a viscosity of 23 centipoises at 25° C.

EXAMPLE 2

This example illustrates the use of several different liquid mixtures of sulphur dioxide with polychlorinated aliphatic hydrocarbons as media for the sulphonation of polystyrene. In each of several experiments there were prepared a solution of 6.6 ml. of liquid sulphur trioxide and 400 ml. of liquid sulphur dioxide and another solution of 10 grams of polystyrene having a solution viscosity of 36, 200 ml. of liquid sulphur dioxide and 200 ml. of the polychlorinated hydrocarbon named in the following table. The two solutions were simultaneously fed into a pressure-resistant vessel which initially contained a solution of 300 ml. of liquid sulphur dioxide and 300 ml. of the polychlorinated hydrocarbon named in the table. The starting solutions were fed to the vessel in a period of less than 10 minutes and the mixture in the vessel was agitated during introduction of the solutions. Also, the mixture in the vessel was maintained at the temperature indicated in the following table during, and after, feed of the starting materials thereto. After the starting solutions had been fed to the vessel, the latter was opened to vent gases therefrom and the reaction mixture was removed. The reaction mixture obtained in each of the experiments was a slurry of a granular polystyrene sulphonic acid in the mixed solvent. The slurry was filtered to separate the product, and the latter was washed with diethyl ether and dried under vacuum. A portion of each product was analyzed to determine the extent to which it had been sulphonated. In the following table the degree of sulphonation is expressed as "per cent sulphonation," the introduction of one sulphonic acid radical per aromatic nucleus of the product being arbitrarily regarded as 100 per cent sulphonation. A portion of each product was neutralized with a dilute aqueous sodium hydroxide solution to form an aqueous solution containing 0.55 per cent by weight of the sodium salt of the sulphonated polystyrene. The viscosity in centipoises at 25° C. of the resultant solution was determined. Table I names the polychlorinated aliphatic hydrocarbon which was employed as an ingredient of the mixed solvent that was used in each experiment. The table also gives the temperature, or range of temperatures, at which the sulphonation reaction was carried out; the per cent sulphonation of the sulphonated polystyrene product; and the viscosity, in centipoises at 25° C., of a 0.55 per cent by weight solution of the sodium salt of the sulphonated polystyrene in water.

*Table I*

| Run No. | Polychlorinated Hydrocarbon In The Solvent Mixture | Sulphonation Temperature, ° C. | Percent Sulphonation | Viscosity of Aqueous Solution of Product |
|---|---|---|---|---|
| 1 | CCl₄ | 25–30 | 100 | 40 |
| 2 | CH₂Cl₂ | 25–30 | 89 | 35 |
| 3 | CCl₄ | —10 | 87 | 34 |
| 4 | CH₂Cl₂ | —10 | 76 | 52 |
| 5 | C₂Cl₄ | —10 | 87 | 60 |
| 6 | CH₃CCl₃ | —10 | 87 | 280 |
| 7 | ClCH₂CH₂Cl | —10 | 100 | 270 |

EXAMPLE 3

This example illustrates the effect of changes in the relative proportions of sulphur dioxide and carbon tetrachloride in mixtures of the two which were used as media for the sulphonation of polystyrene. In each of a series of experiments there was prepared a solution of 10 grams of polystyrene, having a solution viscosity of 36, in 540 ml. of a solvent mixture composed of sulphur dioxide and carbon tetrachloride in the relative proportions given in Table II. The solution was prepared in a pressure-resistant vessel and was at approximately room temperature. A solution of 6.6 ml. of liquid sulphur trioxide in another 400 ml. portion of the same solvent mixture was fed under pressure to the vessel in a period of from 2 to 5 minutes while agitating the mixture in the vessel. Thereafter, the reacted mixture was removed and filtered to recover the granular polystyrene product. The latter was washed with diethyl ether and dried under vacuum, as described in Example 2. A portion of the product was analyzed to determine the extent to which it had been sulphonated. Another portion of the product was neutralized with a dilute aqueous sodium hydroxide solution to form a mixture, or a solution, containing 0.55 per cent by weight of the sodium salt of the sulphonated polystyrene. In most instances, a clear solution was obtained, but in one instance the sulphonated polystyrene sodium salt was insoluble in water. Each aqueous solution thus obtained was tested to determine its viscosity. Table II gives the relative proportions, in per cent by weight, of sulphur dioxide and carbon tetrachloride in the solvent mixture which was employed in each of the experiments. It also gives the per cent sulphonation of the polystyrene sulphonate product and the viscosity in centipoises at 25° C. of the aqueous solution of the sodium salt of the product.

*Table II*

| Run No. | Reaction Medium | | Percent Sulphonation | Viscosity of Aqueous Solution |
|---|---|---|---|---|
| | Percent SO$_2$ | Percent CCl$_4$ | | |
| 1 | 0 | 100 | 95 | 6,800. |
| 2 | 20 | 80 | 66 | 250. |
| 3 | 50 | 50 | 93 | 23. |
| 4 | 60 | 40 | 82 | 50. |
| 5 | 75 | 25 | 100 | 44. |
| 6 | 100 | 0 | 81 | Insoluble. |

EXAMPLE 4

This example illustrates the effect of changes in the relative proportions of sulphur dioxide and carbon tetrachloride in liquid mixtures thereof which were employed as media in sulphonating polystyrene at a temperature of −10° C. In each of a series of experiments there was prepared a solution of 10 grams of polystyrene, having a solution viscosity of 36, in 400 ml. of a mixture composed of sulphur dioxide and carbon tetrachloride in the proportions indicated in the following table. There was also prepared a solution of 6.6 ml. of liquid sulphur trioxide in another 400 ml. portion of the same solvent mixture. The two solutions were simultaneously fed, in a period of from 10 to 20 minutes, to a reaction vessel, which initially contained a 600 ml. portion of the solvent mixture, while vigorously stirring the mixture in the vessel. The mixture was maintained at a temperature of approximately −10° C. during the addition. Upon feeding the two solutions to the vessel, a sulphonation reaction occurred rapidly and a precipitate of sulphonated polystyrene was formed. The reacted mixture was filtered to separate the product and the latter was washed with diethyl ether and dried under vacuum. A portion of each product was analyzed to determine the extent of the sulphonation reaction. Another portion of each product was neutralized with a dilute aqueous sodium hydroxide solution to form a solution containing 0.55 per cent by weight of the sodium salt of the product and the viscosity of the solution was determined. Table III gives the relative proportions, in per cent by weight, of sulphur dioxide and carbon tetrachloride in the liquid solvent mixture employed as a medium in each experiment. It also gives the per cent sulphonation of the sulphonated polystyrene product and the viscosity, in cps. at 25° C., of the 0.55 per cent aqueous solution of the sodium salt of the product.

*Table III*

| Run No. | Reaction Medium | | Percent Sulphonation | Viscosity of Aqueous Solution |
|---|---|---|---|---|
| | Percent SO$_2$ | Percent CCl$_4$ | | |
| 1 | 10 | 90 | 76 | 4,900 |
| 2 | 20 | 80 | 76 | 700 |
| 3 | 30 | 70 | 81 | 90 |
| 4 | 40 | 60 | 66 | 40 |
| 5 | 50 | 50 | 71 | 45 |
| 6 | 60 | 40 | 71 | 45 |
| 7 | 70 | 30 | 66 | 55 |
| 8 | 75 | 25 | 81 | 230 |

The sulphonated products described in Runs 1–7 of the above table were all readily soluble in water to form clear solutions. However, the sulphonated polystyrene sodium salt obtained in Run 8 was only partially soluble. Also, in Run 8, the polystyrene starting material was not completely dissolved by the solvent mixture which was employed.

EXAMPLE 5

A series of experiments were carried out for the purpose of sulphonating several alkenyl aromatic resins. The procedure employed in each experiment was to prepare a solution of 10 grams of the alkenyl aromatic resin in a mixture of 200 ml. of liquid sulphur dioxide and 350 ml. of carbon tetrachloride and to prepare another separate solution of 6.6 ml. of liquid sulphur trioxide in a mixture of 200 ml. of sulphur dioxide and 200 ml. of carbon tetrachloride. The two solutions were fed simultaneously, in from 8 to 10 minutes, into a reaction vessel which initially contained a mixture of 300 ml. of liquid sulphur dioxide and 300 ml. of carbon tetrachloride. The reaction mixture was stirred vigorously and maintained at approximately −10° C. during the addition. Upon admixing the reactants, a sulphonation occurred almost instantaneously and a granular resin sulphonate was formed. Each reaction mixture was removed from the vessel, filtered to separate the sulphonated resin, and the latter was washed with diethyl ether and dried at a temperature of 100° C. and an absolute pressure of 10 mm. for a period of 20 minutes. Each of the resin sulphonic acids was neutralized with a dilute aqueous sodium hydroxide solution so as to form an aqueous solution containing 0.55 per cent by weight of the sodium salt of the sulphonated resin. The viscosity of the solution was determined. Table IV names the alkenyl aromatic resin which was employed in each experiment and gives the solution viscosity, i. e. the viscosity of a 10 weight per cent solution of the same in toluene at 25° C. The table gives the viscosity in centipoises at 25° C., of the 0.55 per cent by weight aqueous solution of the sodium resin sulphonate which was prepared in each experiment.

Table IV

| Run No. | Resin | Viscosity of Aqueous Salt Solution |
|---|---|---|
| 1 | Copolymer of equal parts by weight of styrene and ar-methylstyrene which copolymer has a solution viscosity of 33. | 17.5 |
| 2 | Polymerized alpha-methylstyrene having a solution viscosity of 26. | 60 |
| 3 | Polymerized ar-methylstyrene having a solution viscosity of 28. | 10 |
| 4 | Polymerized ar-mono-chlorostyrene having a solution viscosity of 533. | 9 |

I claim:

1. A method for sulphonating a benzene-soluble, thermoplastic alkenyl aromatic resin which comprises reacting sulphur trioxide with the resin at temperatures between —20° and 40° C. while having the reactants dissolved in a liquid mixture of from 20 to 80 weight per cent of sulphur dioxide and from 80 to 20 per cent of at least one polychlorinated aliphatic hydrocarbon of the class consisting of methylene chloride, carbon tetrachloride, tetrachloroethylene, methylchloroform and ethylene chloride.

2. A method for sulphonating a benzene-soluble, thermoplastic alkenyl aromatic resin which comprises reacting sulphur trioxide with the resin at temperatures between —20° and 40° C. while having the sulphur trioxide and the resin dissolved in a liquid mixture of from 20 to 80 weight per cent of sulphur dioxide and from 80 to 20 per cent of at least one polychlorinated aliphatic hydrocarbon of the class consisting of methylene chloride, carbon tetrachloride, tetrachloroethylene, methylchloroform and ethylene chloride, the sulphur trioxide and the resin being employed in proportions such that the combined weight of the same does not exceed 3 per cent of the weight of the entire mixture.

3. A method, as claimed in claim 2, wherein the sulphur trioxide is employed in a proportion corresponding to that theoretically required in order to sulphonate the resin to an extent such as to contain an average of from 0.7 to 1.1 sulphonic acid radical per aromatic nucleus of the same; and the combined weight of the sulphur trioxide and resin starting materials does not exceed 2 per cent of the weight of the reaction mixture.

4. A method, as claimed in claim 3, wherein the liquid solvent mixture consists essentially of sulphur dioxide and tetrachloroethylene.

5. A method, as claimed in claim 3, wherein the liquid solvent mixture consists essentially of from 30 to 70 per cent by weight of sulphur dioxide and from 70 to 30 per cent of carbon tetrachloride, and the sulphonation is accomplished by forming a liquid solution of the sulphur trioxide in a portion of the solvent mixture, forming a separate liquid solution of the resin in another portion of the solvent mixture, and passing the two solutions into admixture with one another while stirring and maintaining the resultant mixture at temperatures between —15° and 0° C.

6. A method, as claimed in claim 3, wherein the alkenyl aromatic resin is polystyrene and the liquid solvent mixture consists essentially of from 30 to 70 per cent by weight of sulphur dioxide and from 70 to 30 per cent of carbon tetrachloride.

7. A method, as claimed in claim 3, wherein the alkenyl aromatic resin is a thermoplastic copolymer of styrene and ar-methylstyrene, the liquid solvent mixture consists essentially of from 30 to 70 per cent by weight of sulphur dioxide and from 70 to 30 per cent of carbon tetrachloride.

8. A method, as claimed in claim 3, wherein the alkenyl aromatic resin is a solid thermoplastic polymer of alpha-methylstyrene, the liquid solvent mixture consists essentially of from 30 to 70 per cent by weight of sulphur dioxide and from 70 to 30 per cent of carbon tetrachloride.

9. A method, as claimed in claim 3, wherein the alkenyl aromatic resin is a solid thermoplastic polymer of ar-chlorostyrene, the liquid solvent mixture consists essentially of from 30 to 70 per cent by weight of sulphur dioxide and from 70 to 30 per cent of carbon tetrachloride.

References Cited in the file of this patent

UNITED STATES PATENTS

| Number | Name | Date |
|---|---|---|
| 2,500,149 | Boyer | Mar. 14, 1950 |